(12) United States Patent
Kaku

(10) Patent No.: US 9,906,377 B2
(45) Date of Patent: Feb. 27, 2018

(54) COMMUNICATION NETWORK AND RELAY DEVICE

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 61 days.

(21) Appl. No.: 15/214,528

(22) Filed: Jul. 20, 2016

(65) Prior Publication Data

US 2017/0041161 A1  Feb. 9, 2017

(30) Foreign Application Priority Data

Aug. 5, 2015  (JP) .................................. 2015-155036

(51) Int. Cl.
*H04L 12/43* (2006.01)
*H04L 12/437* (2006.01)
*H04L 12/24* (2006.01)
*H04L 12/26* (2006.01)

(52) U.S. Cl.
CPC ........ *H04L 12/437* (2013.01); *H04L 41/0654* (2013.01); *H04L 43/0847* (2013.01)

(58) Field of Classification Search
CPC ............... H04L 12/437; H04L 41/0654; H04L 43/0847
See application file for complete search history.

(56) References Cited

U.S. PATENT DOCUMENTS

| 5,461,608 | A  | * | 10/1995 | Yoshiyama | ............. | H04J 3/085 340/3.44 |
| 6,728,207 | B1 |   | 4/2004  | Askinger et al. | | |
| 2003/0012129 | A1 | * | 1/2003 | Lee | ......................... | H04J 3/085 370/216 |
| 2005/0201409 | A1 | * | 9/2005 | Griswold | ................ | H04L 12/42 370/445 |
| 2007/0237072 | A1 | * | 10/2007 | Scholl | ..................... | H04L 12/66 370/222 |
| 2008/0107027 | A1 |   | 5/2008  | Allan et al. | | |
| 2008/0118244 | A1 | * | 5/2008  | Nakada | ..................... | H04J 3/14 398/59 |
| 2008/0239970 | A1 | * | 10/2008 | Lu | ..................... | H04L 12/40182 370/245 |

FOREIGN PATENT DOCUMENTS

JP  09-205450 A  8/1997

\* cited by examiner

*Primary Examiner* — Ian N Moore
*Assistant Examiner* — Ronald h Davis
(74) *Attorney, Agent, or Firm* — Posz Law Group, PLC

(57) ABSTRACT

A communication network including relay devices connected in a ring shape is provided. A master relay device transmits an abnormality detection frame from one of two specific ports at fixed time intervals in a frame circulation direction. When neither the frame abnormality detection nor an abnormality notification frame transmitted from another relay device is received from the other of the two specific ports within a predetermined time period from transmission of the abnormality detection frame, the master relay device specifies an occurrence of an abnormality in a communication path between the master relay device and a relay device connected next to the master relay device in a direction opposite to the frame circulation direction.

5 Claims, 6 Drawing Sheets

FIG. 2
| PREAMBLE 8 BYTES | DESTINATION MAC ADDRESS 6 BYTES | SOURCE MAC ADDRESS 6 BYTES | TYPE 2 BYTES | DATA 46 – 1500 BYTES | FCS 4 BYTES |
FIG. 3
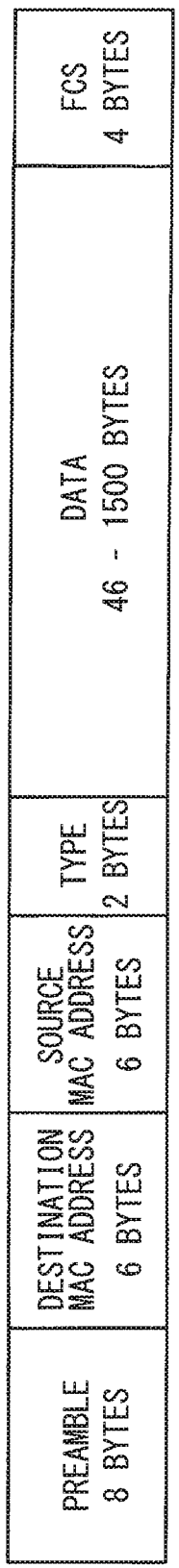
|  |  |  |
|---|---|---|
| P1 | ID52 | ID53 | ID54 |
| P2 | ID54 | ID53 | ID52 |
FIG. 4
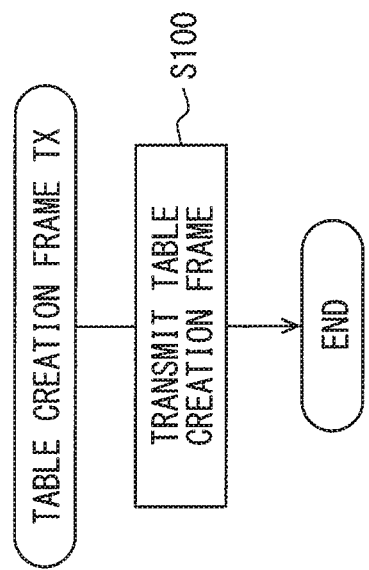

COMMUNICATION NETWORK AND RELAY DEVICE

CROSS REFERENCE TO RELATED APPLICATION

This application is based on Japanese Patent Application No. 2015-155036 filed on Aug. 5, 2015, disclosure of which is incorporated herein by reference.

TECHNICAL FIELD

The present disclosure relates to a communication network including relay devices connected in a ring shape and relates to a relay device constituting the communication network.

BACKGROUND

For example, in an Ethernet (registered trademark) network, Ethernet switches (referred to hereinafter as a switch for simplicity) acting as multiple relay devices are connected in a ring shape to form a ring topology. In the ring topology, two ports of each switch are connected to ports of other switches to connect the multiple switches in the ring shape. The multiple switches and communication lines connecting the switches constitute a ring shape communication path allowing frame circulation. The ring shape communication path can be used as a two-way communication path through which each switch can perform transmission in both of a clockwise direction and an anticlockwise direction (for example, see Patent Literature 1).

Patent Literature 1: JP-2010-509825A

SUMMARY

In the communication network including multiple relay devices connected in a ring shape, an abnormality may occur in any sections of the ring shape communication path. However, a technology for specifying in which section of the communication path the abnormality occurs does not exist.

It is therefore an object of the present disclosure to provide a technology that can specify an abnormality section of a communication path in a communication network in which multiple relay devices are connected in a ring shape.

A communication network in a first aspect of the present disclosure comprises a plurality of relay devices each including a plurality of ports for frame transmission and reception. The ports of each relay device include two specific ports. The relay devices are connected in a ring shape by connecting the two specific ports of the relay devices.

Each relay device includes a storage for storing identification information of other relay devices, which constitutes the relay devices connected in the ring shape, and for storing connection information indicating an order in which the other relay devices are connected when viewed from the relay device.

A master relay device, which is one of the relay devices, includes an abnormality detection frame transmission section and a master side specification section.

The abnormality detection frame transmission section transmits an abnormality detection frame at fixed time intervals from one of the two specific ports of the master relay device. The one of the two specific ports from which the abnormality detection frame is transmitted is a first specific port and the other of the two specific ports is a second specific port.

When neither the frame abnormality detection nor an abnormality notification frame transmitted from another relay device is received from the second specific port of the master relay device within a predetermined time period from transmission of the abnormality detection frame from the abnormality detection frame transmission section, the master side specification section performs the following.

The master side specification section specifies, from the connection information, the identification information of a first-connected relay device which is the relay device that is first connected when viewed from the second specific port of the master relay device. The master side specification section specifies an occurrence of an abnormality in a communication path between the first-connected relay device and the second specific port of the master relay device. The master side specification section transmits, from the first specific port, an abnormality notification frame that contains the identification information of the master relay device.

The relay devices other than the master relay device are slave relay devices. Each slave relay device includes an abnormality detection frame forwarding section and a slave side specification section.

The abnormality detection frame forwarding section of the salve relay device, upon receipt of the abnormality detection frame from any one of the two specific ports, transmits the received abnormality detection frame from the other of the two specific ports. Of the two specific ports of each slave relay device, one from which the abnormality detection frame is received is an upstream side specific port and the other is a downstream side specific port.

When neither the abnormality detection frame nor the abnormality notification frame transmitted from another relay device is received from the upstream side specific port of the slave relay device within a predetermined time period from receipt of the abnormality detection frame at the upstream side specific port of the slave relay device, the slave side specification section performs the following.

The slave side specification section specifies the identification information of a first-connected relay device which is the relay device that is first connected when viewed from the upstream side specific port. The slave side specification section specifies an occurrence of an abnormality in a communication path between the first-connected relay device and the upstream side specific port. The slave side specification section transmits, from the downstream side specific port, an abnormality notification frame that contains the identification information of the slave relay device.

Each of the master relay device and the slave relay devices includes a notification reception process section. When one of the two specific ports of the relay device receives the abnormality notification frame transmitted from another relay device, the notification reception process section of the relay device performs the following.

The notification reception process section transmits the received abnormality notification from the other of the two specific ports, and specifies, from the connection information, the identification information of a particular-away relay device. The particular-away relay device is the relay device that is, when viewed from the one of the two specific ports which received the abnormality notification frame, connected next to and on a far side of the relay device identified by the identification information contained in the received abnormality notification frame. The notification reception process section specifies an occurrence of an abnormality in a communication path between the particular-away relay device and the relay device identified by the identification information contained in the received abnormality notification frame.

In this communication network, the plurality of relay device and communication lines connecting the relay devices (specifically, communication lines connecting the two specific ports of the relay devices) constitute a ring shape communication path that allows a frame to circulate one round.

When the communication path is normal, the abnormality detection frame is circulated one round around the communication path at the fixed time intervals as a result of operations of the abnormality detection frame transmission section of the master relay device and the abnormality detection frame forward sections of the slave relay devices. Specifically, the abnormality detection frame transmitted from the first specific port of the master relay device at the fixed time intervals is returned back to the second specific port of the master relay device via the slave relay devices. In the below description, a direction in which the abnormality detection frame is circulated is called a frame circulation direction.

It is assumed that an abnormality occurs in a communication path between adjacent two relay devices A and B and a frame transmission becomes impossible between the relay devices A and B. It is further assumed that the relay device A is arranged on a downstream side of the relay device B in the frame circulation direction.

The relay device A is assumed to a master relay device. The master side specification section specifies the abnormal section of the communication path. Specifically, the master side specification section specifies the occurrence of the abnormality in the communication network between a relay device (the relay device B in this example), which is first connected when viewed from the second specific port of the master relay device A, and the second specific port of the master relay device A. Furthermore, the master side specification section transmits an abnormality notification frame containing the identification information of the master relay device A from the first specific port of the master relay device A.

The abnormality notification frame transmitted from the relay device A is forwarded in turn via other relay devices by the notification reception process sections of the other relay devices and finally arrives at the relay device B. The notification reception process sections of the other relay devices and the relay device B specifies the abnormal section of the communication path. In this example, the communication path between the relay devices A and B is specified as being abnormal.

The relay device A is assumed to a slave relay device. The slave side specification section specifies the abnormal section of the communication path. Specifically, the slave side specification section specifies the occurrence of the abnormality in the communication network between a relay device (the relay device B in this example), which is first connected when viewed from the upstream side specific port of the slave delay device A, and the upstream side specific port of the slave relay device A. In the above, the upstream side specific port is of the specific port that received the abnormality detection frame last time. Furthermore, the slave side specification section transmits an abnormality notification frame containing the identification information of the relay device A from the specific port other than the upstream side specific port.

In this case also, the abnormality notification frame transmitted from the relay device A is forwarded in turn via other relay devices by the notification reception process sections of the other relay devices and finally arrives at the relay device B. The notification reception process sections of the other relay devices and the relay device B specifies the abnormal section of the communication path.

Therefore, if an abnormality occurs in any of the ring shape communication path, each relay device in the communication network can specify the abnormal section of the communication path.

A communication network using a subject relay device in a second aspect of the present disclosure comprises a plurality of relay devices each including a plurality of ports for frame transmission and reception. The ports of each relay device include two specific ports. The relay devices are connected in a ring shape by connecting the two specific ports of the relay devices. The subject relay device in the second aspect of the present disclosure is used as each relay device in this communication network.

The subject relay device in the second aspect comprises a storage for storing the above-described connection information and further comprises a determination section and a mode set section.

The determination section determines whether or not one identification information meeting a predetermined condition among the identification information of the subject relay device and the identification information of other relay devices indicated in the connection information of the subject relay device is the identification information of the subject relay device.

The mode set section sets an operation mode of the subject relay device to a master mode when the determination section determines that the one identification information meeting the predetermined condition is the identification information of the subject relay device. The mode set section sets the operation mode of the subject relay device to a slave mode when the determination section determines that the one identification information meeting the predetermined condition is not the identification information of the subject relay device;

The subject relay device in the second aspect further comprises the above-described abnormality detection frame transmission section and master side specification section each operating when the operation mode of the subject relay device is set to the master mode.

The subject relay device in the second aspect further comprises the above-described abnormality detection frame forward section and salve side specification section each operating when the operation mode of the subject relay device is set to the slave mode.

The subject relay device in the second aspect further comprises the above-described notification reception process section operating when the operation mode of the subject relay device is set to any of the mater mode and the slave mode.

The subject relay device in the second aspect is usable as a relay device constituting the communication network in the first aspect and is usable as both of the master relay device and the slave relay device.

BRIEF DESCRIPTION OF DRAWINGS

The above and other objects, features and advantages of the present disclosure will become more apparent from the following detailed description made with reference to the following drawings. In the drawings:

FIG. 2 is a diagram illustrating a configuration of an Ethernet frame;

FIG. 3 is a diagram showing one example of switch ID table;

FIG. 4 is a flowchart illustrating a table creation frame transmission process;

DETAILED DESCRIPTION

Embodiments will be described.
<Configuration>

Figure 1:
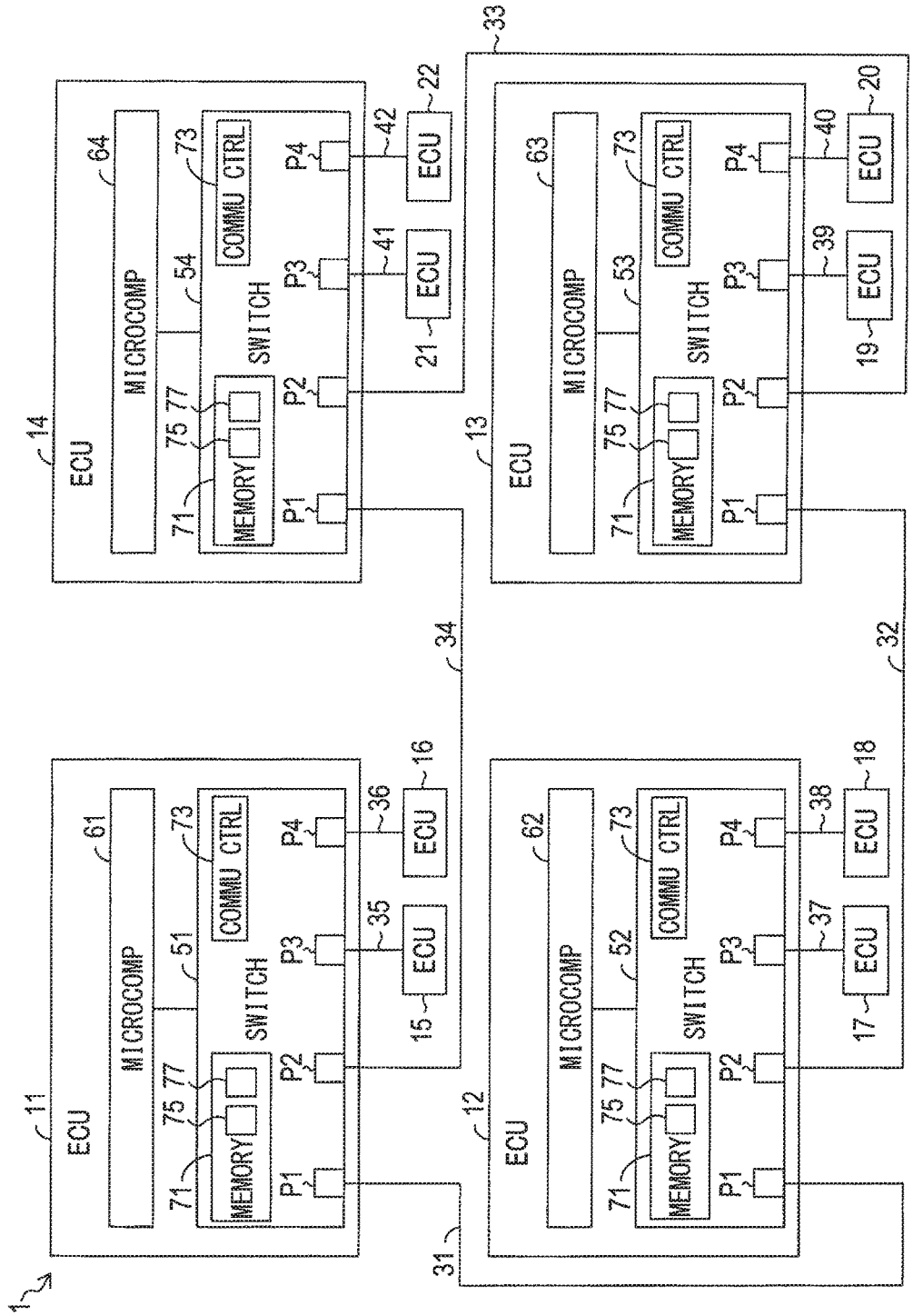
FIG. 1 is a diagram illustrating a configuration of a communication network of an embodiment.

A communication network 1 of an embodiment illustrated in FIG. 1 is, for example, an Ethernet network mounted in a vehicle such as an automobile and constitutes an in-vehicle communication network.

As shown in FIG. 1, the communication network 1 includes electronic control units (ECUs) 11 to 22 and communication lines 31 to 42. The ECUs 11 to 14, respectively, include Ethernet switches 51 to 54, which act as relay devices for relaying communications with other ECUs 15 to 22. The Ethernet switches 51 to 54 are network switches of Ethernet. The ECUs 11 to 14, respectively, further include microcomputers 61 to 64 acting as processors. The microcomputer 61 to 64 includes a CPU, a ROM, and a RAM (each not shown).

The switch 51 to 54 is, for example, a layer 2 switch (L2 switch) and performs communications for relay in accordance with Ethernet standards. Thus, each switch 51 to 54 includes multiple ports P1 to P4 (four ports in this example) for frame transmission and receipt, a MAC address table 71, and a communication controller 73 which performs a communication process for relay in in accordance with Ethernet standards.

The MAC address table 71 is stored in a memory 75 of each switch 51 to 54. The memory 75 may be, for example, a volatile memory or a rewritable non-volatile memory. The memory 75 corresponds to an example of a storage. The communication controller 73 may be provided by, for example, an integrated circuit, a microcomputer or the like. Operations of the switch 51 to 54 are implemented by the communication controller 73.

In this communication network 1, the port P1 of the switch 51 of the ECU 11 is connected to the port P1 of the switch 52 of the ECU 12 by the communication line 31. The port P2 of the switch 52 of the ECU 12 is connected to the P1 of the switch 53 of the ECU 13 by the communication line 32. The port P2 of the switch 53 of the ECU 13 is connected to the port P2 of the switch 54 of the ECU 14 by the communication line 33. The port P1 of the switch 54 of the ECU 14 is connected to the port P2 of the switch 51 of the ECU 11 by the communication line 34.

Thus, the switches 51 to 54 are connected in a ring shape, in which the ports P1, P2 of each switch are connected to the ports P1, P2 of other switches. Accordingly, the switches 51 to 54 and the communication lines 31 to 34 connecting the switches 51 to 54 constitute a ring shape communication path through which a frame can be circulated one round. The ring shape means a loop.

The ports P3, P4 of the switch 51 of the ECU 11, respectively, are connected to the ECUs 15, 16 via the communication lines 35, 36. The ports P3, P4 of the switch 52 of the ECU 12, respectively, are connected to the ECUs 17, 18 via the communication lines 37, 38. The ports P3, P4 of the switch 53 of the ECU 13, respectively, are connected to the ECUs 19, 20 via the communication lines 39, 40. The ports P3, P4 of the switch 54 of the ECU 14, respectively, are connected to the ECUs 21, 22 via the communication lines 41, 42.

Among the ports P1 to P4 of the switches 51 to 54, the ports P3 and P4 not used in the ring shape connection are connected to the ECUs 15 to 22 acting as communication nodes. Communication paths among the switches 51 to 54 include an anticlockwise communication path and a clockwise communication path. When the starting point is assumed to be, for example, the switch 51, the anticlockwise communication path extends from the switch 51 in a direction toward the switch 52 and the clockwise communication path extends from the switch 51 in a direction toward the switch 54. These two communication paths can function as two communication paths for communications among, of the ECUs 15 to 22, ECUs connected to different switches 51 to 54.

In the below description, among the ports P1 to P4 of the switches 51 to 54, the ports P1 and P2 used in the ring connection are also referred to as ring ports. The ring ports P1 and P2 correspond to examples of specific ports. The ports P3 and P4 (not used in the ring connection) are not the ring ports and are referred to as ordinal ports.

A frame for communications in the communication network 1 is, for example, an Ethernet frame, as illustrated in FIG. 2. The Ethernet frame has various areas including a preamble, a destination MAC address, a source MAC address, type, data, and FCS (Frame Check Sequence). The destination MAC address is a MAC address of a destination device and corresponds to a destination address. The source MAC address is a MAC address of a source device of a frame and corresponds to a source address. The MAC address corresponds to an address of a device.

In the MAC address table 71 of the switch 51 to 54, MAC addresses of devices connected to respective ports of the switch are registered.

Each switch 51 to 54 creates the MAC address table 71 by a well-known MAC address learning function. For example, upon receipt of a frame via any of the ports P1 to P4, the switch 51 to 54 registers, in the MAC address table 71, the number of the port which receives the frame and the source MAC address contained in the received frame so that the number of the port and the source MAC address are associated with each other.

Each switch 51 to 54 has the below-described frame forwarding function. Upon receipt of a frame via any of the ports P1 to P4, the switch 51 to 54 determines a port for forwarding the received frame, based on the destination MAC address in the received frame and the MAC address table 71.

Specifically, each switch 51 to 54 determines, for each port other P1 to P4 than the port which received the frame, whether the MAC address identical to the destination MAC address in the received frame is registered in the MAC address table 71. When it is determined that the MAC address identical to the destination MAC address in the received frame is registered, the switch determines that the port associated with this MAC address in the MAC address table 71 is a port for forwarding. When the MAC address identical to the destination MAC address in the received frame is not registered in the MAC address table 71, the switch determines that all of the ports other than the port which received the frame are ports for forwarding.

Then the switch 51 to 54 transmits the received frame from the port determines as the port for forwarding. This frame forwarding function can also serve as a relay function for relaying a frame among ECUs. The frame forwarding operation when the MAC address identical to the destination MAC address is registered in the MAC address table 71 is called "filtering". The frame forwarding operation when the MAC address identical to the destination MAC address is not registered in the MAC address table 71 is called "flooding".

By the MAC address learning function and the frame forwarding function of the switch 51 to 54, the MAC address of a device connected to each port P1 to P4 is registered in the MAC address table 71 of each switch 51 to 54.

For example, in the MAC address table 71 of the switch 51, the MAC address of the ECU 15 is registered in association with the ordinal port P3 and the MAC address of the ECU 16 is registered in association with the ordinal port P4. The MAC address of the ECUs 17 to 22 connected to the ordinal ports P3, P4 of other switches 52 to 54 are registered in association with each of the ring ports P1, P2. This is because the ring ports P1, P2 of the switch 51 are connected to the ECUs 17 to 22 via other switches 52 to 54.

Likewise, for example, in the MAC address table 71 of the switch 52, the MAC address of the ECU 17 is registered in association with the ordinal port P3 and the MAC address of the ECU 18 is registered in association with the ordinal port P4. The MAC addresses of the ECUs 15, 16, 19 to 22 connected to the ordinal ports P3, P4 of other switches 51, 53 and 54 are registered in association with each of the ring ports P1, P2.

In this communication network 1, when a frame whose destination is an ECU connected to an ordinal port P3, P4 of a certain switch is transmitted from a ring port P1, P2 of any of the switches, this frame is inputted to the ring port P1, P2 of this certain switch.

For example, suppose that the ECU 15, which is connected to the normal P3 of the switch 51, transmits the frame designating, as a destination, the ECU 19 which is connected to the ordinal port P3 of the switch 53. It is noted that the frame designating the ECU 19 as a destination is a frame that has the MAC address of the ECU 19 as the destination MAC address. Additionally, the frame transmitted from the ECU 15 has the MAC address of the ECU 15 as the source MAC address. In the below description, the frame transmitted from the ECU 15 and designating the ECU 19 as the destination is referred to as a frame f15-19.

In this case, the switch 51 receives the frame f15-19 from the ordinal port P3. When the switch 51 transmits the received frame f15-19 from the ring port P1, this frame f15-19 is inputted to the ring port P1 of the switch 53 via the switch 52. This is because the switch 52 receives, from the ring port P1, the frame f15-19 transmitted by the switch 51, and transmits it from the ring port P2 by the filtering.

When the switch 51 transmits the received frame f15-19 from the ring port P2, this frame f15-19 is inputted to the ring port P2 of the switch 53 via the switch 54. This is because the switch 54 receives, from the ring port P1, the frame f15-19 transmitted by the switch 51 and transmits it from the ring port P2 by the filtering.

Each switch 51 to 54 includes a non-volatile memory (not shown) storing an ID (identification) of the self-switch. The ID of the switch is a data for identifying the switch and corresponds to an example of identification information.

The memory 75 of each switch 51 to 54 stores a switch ID table 77. The switch ID table 77 stored in the memory 75 of the self-switch 51 to 54 is a table indicating IDs of other switches connected in the ring shape. The switch ID table 77 further indicates an order in which the other switches are connected from at least one of the ring ports P1, P2 of the self-switch (i.e., an order in which the other switches are connected when viewed from at least one of the ring ports P1, P2 of the self-switch). The switch ID table 77 corresponds to an example of connection information.

FIG. 3 shows an example of the switch ID table 77 of the switch 51 (specifically, the switch ID table 77 stored in the memory 75 of the switch 51). In FIG. 3 and the below description, ID of a switch n is referred to as "IDn", where the reference numeral "n" is assigned to the switch.

As shown in FIG. 3, in the switch ID table 77, IDs of other switches are registered for each ring port P1, P2 in the order in which the other switches are connected from the ring port P1, P2.

In the switch ID table 77 of the switch 51, ID52 to ID54 of switches 52 to 54 are registered for the port P1 in the following order: the ID52, the ID53 and the ID54. This is because an order in which the other switches 52 to 54 are connected from the port P1 of the switch 51 is the ID52, the ID53 and the ID54. The ID52 to ID54 of switches 52 to 54 are registered for the port P2 in the following order: the ID54, the ID53 and the ID52.

In the switch ID table 77 of each switch 51 to 54, the order of connection of other switches from each ring port P1, P2 is indicated by an ID registration order. In FIG. 3, the ID registered closer to the left is the ID of the switch closer to the port P1, P2. Thus, in the switch ID table 77 of each switch 51 to 54, a registration order of Ds of other switches for the port P1 is opposite to a registration order of IDs of other switches for the port P2.

The switch ID table 77 may be configured such that for only one of the ring ports P1, P2, the IDs of other switches are registered in the same order as the other switches are connected when viewed from to the one of the ring ports. Specifically, the switch ID table 77 may have only one of the upper low and the lower low of FIG. 3. This is because once the order in which other switches are connected from the one ring port is specified, reversing this order specifies the order in which other switches are connected when viewed from the other ring port.

In the switch ID table 77, the order in which the switches are connected may not be indicated by the order in which the IDs are registered but may be indicated by, for example, assigning a consecutive number on an ID-by-ID basis. Moreover, at a fixed position in the switch ID table 77 of each switch 51 to 54, the ID of the self-switch may be further registered. In this case, this further registered ID may be neglected when the order in which other switches are connected is specified.

<Processes Specific to Embodiment>

A process performed by each switch 51 to 54 for specifying an abnormal section of the communication path will be described.

<<Table Creation Frame Transmission Process>>

Upon starting operating, each switch 51 to 54 performs a table creation frame transmission process illustrated in FIG. 4 at least once, as a process for creating the switch ID table 77. The switch acting as a subject-of-action of the table creation frame transmission process is called a self-switch.

At S100, the self-switch 51 to 54 transmits a table creation frame containing the ID of the self-switch from one of the ring ports P1, P2 of the self-switch.

The table creation frame is provided as an Ethernet frame, as illustrated in FIG. 2. For example, the destination MAC address of the table creation frame has a code indicating that this frame is the table creation frame. The data area of the table creation frame is used as an ID area for storing IDs of multiple switches.

Specifically, at S100 of FIG. 4, the self-switch 51 to 54 transmits the table creation frame, in which the ID of the self-switch is embedded at the beginning of the ID area, from any one of the ring ports P1, P2. Alternatively, the self-switch 51 to 54 may transmit the table creation frame from both of the ring ports P1, P2.

The table creation frame corresponds to an example of connection information creation frame and the ID area of the table creation frame corresponds to an example of identification information storage area.

<<Table Creation Process>>

Figure 5:
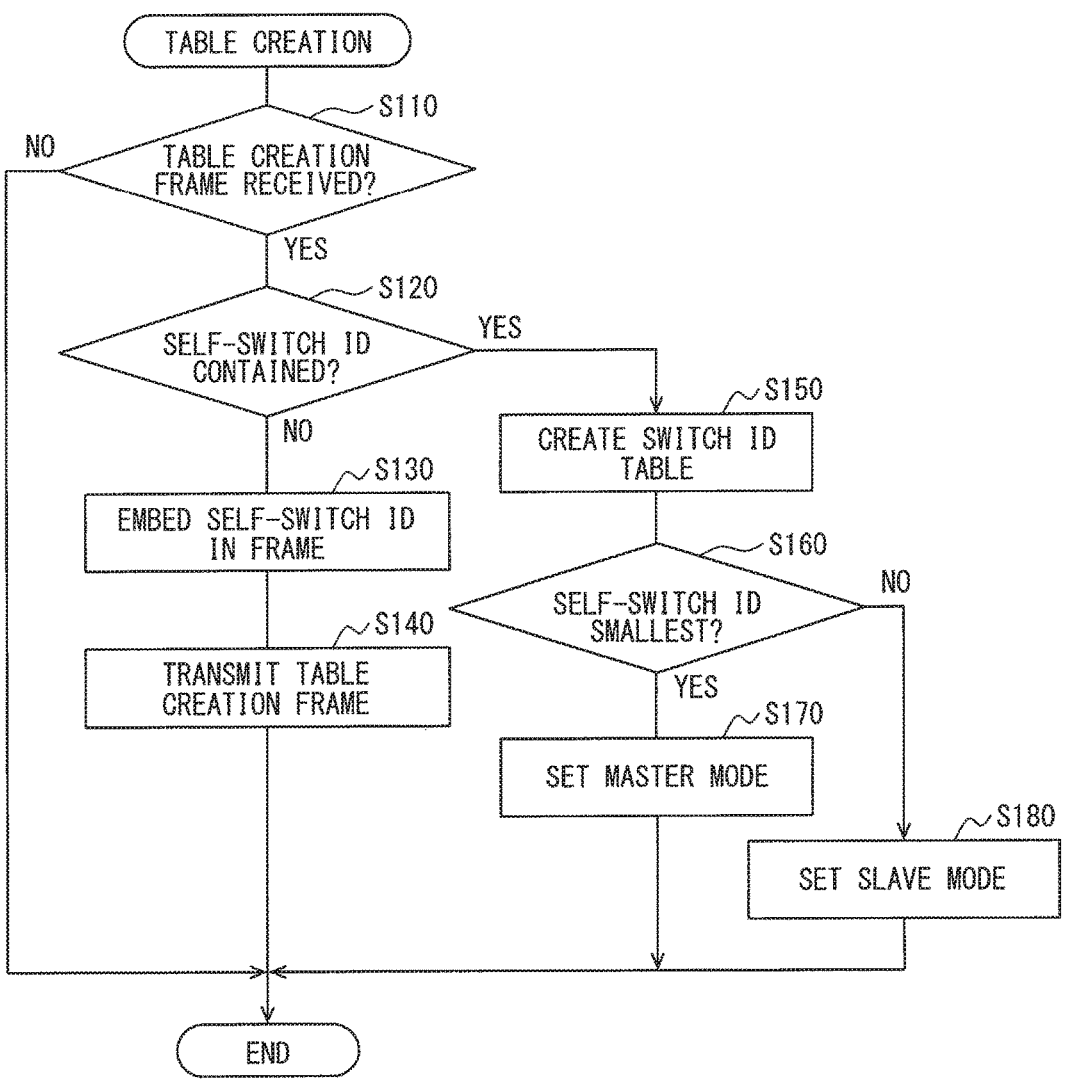
FIG. 5 is a flowchart illustrating a table creation process.

Each switch 51 to 54 performs a table creation process illustrated in FIG. 5 as a process for creating the switch ID table 77. The table creation process may be performed at fixed time intervals. Alternatively, the table creation process may be performed upon frame receipt at any of the ring ports P1, P2.

As shown in FIG. 5, at S110, the self-switch 51 to 54 determines whether or not the table creation frame is received from any of the ring ports P1, P2. When the table creation frame is not received, this table creation process is ended.

When the table creation frame is received, the process proceeds to S120. At S120, the self-switch 51 to 54 determines whether or not the ID of the self-switch is contained in the received table creation frame. Specifically, it is determined whether or not there is the ID of the self-switch at the beginning of the ID area of the table creation frame.

When the self-switch 51 to 54 determines at S120 that the ID of the self-switch is not contained in the table creation frame, in other words, when the self-switch determines that the source of the received table creation frame is other than the self-switch, the process proceeds to S130.

At S130, the self-switch 51 to 54 embeds the ID of the self-switch into the beginning of a free space of the ID area of the received table creation frame. At S140, the self-switch 51 to 54 transmits the table creation frame, in which the ID of the self-switch is embedded, from the ring port P1, P2 other than the ring port that received the table creation frame. Then this table creation process is ended.

When the self-switch 51 to 54 determines at S120 that the ID of the self-switch is contained in the table creation frame, the process proceeds to S150. In this case, the source of the received table creation frame is the self-switch and the received table creation frame has been circulated around the ring communication path one round.

At S150, the self-switch 51 to 54 creates the switch ID table 77 from the IDs of respective switches embedded in the ID area of the received table creation frame and an order in which IDs are arranged in the received table creation frame.

Specifically, from the ID area of the received table creation frame, the self-switch 51 to 54 reads out the IDs of the other switches in the order in which the IDs of the other switches are embedded. The read IDs are referred to as herein an ID group. Then the self-switch 51 to 54 performs the below described first and second registration processes.

<First Registration Process>

The read ID group is registered, without change, in the switch ID table 77 in association with the ring port P1, P2 other than the ring port that received the table creation frame (i.e., in association with the ring port acting as the source of the received table creation frame).

<Second Registration Process>

The order of the read ID group is reversed and the order-reversed ID group is registered in the switch ID table 77 in association with the ring port P1, P2 that received the table creation frame.

When the self-switch 51 to 54 transmits the table creation frame from both of the ring ports P1 and P2 in the process of FIG. 4, only one of the first registration process and the second registration process may be performed at S150 of FIG. 5. In this case, when the port P2 of the self-switch 51 to 54 receives the table creation frame transmitted from the port P1 and the port P1 receives the table creation frame transmitted from the port P2, the switch ID table 77 is created.

At S150, the self-switch 51 to 54 stores the created switch ID table in the memory 75 of the self-switch. At S160, the self-switch 51 to 54 determines whether or not, among the ID of the self-switch and the IDs of other switches indicated in the switch ID table 77, one ID meeting a predetermined particular condition is the ID of the self-switch.

In the present embodiment, the IDs of other switches indicated in the switch ID table 77 are IDs of other switches registered in the switch ID table 77. Additionally, in the present embodiment, the particular condition is, for example, a smallest value.

Thus, at S160, the self-switch 51 to 54 determines whether or not the ID having the smallest value among the ID of the self-switch and the IDs of other switches indicated in the switch ID table 77 is the ID of the self-switch. In other words, it is determined whether or not the ID of the self-switch has the smallest value among the IDs of the switches connected in the ring shape.

When the determination at S160 results in YES (i.e., the ID of the self-switch has the smallest value), the proceeds to S170. At S170, the self-switch 51 to 54 sets an operation mode of the self-switch to a master mode. In the below description, the switch in the master mode is referred to as a master switch. The master switch corresponds to an example of master relay device.

When the determination at S160 results in NO (i.e., the ID of the self-switch has not the smallest value), the proceeds to S180. At S180, the self-switch 51 to 54 sets an operation mode of the self-switch to a slave mode. In the below description, the switch in the slave mode is referred to as a slave switch. The slave switch corresponds to an example of slave relay device.

After setting the operation mode at S170 or S180, the self-switch 51 to 54 ends this table creation process. Each switch 51 to 54 performs the table creation frame transmission process of FIG. 4 and the table creation process of FIG. 5, thereby creating the switch ID table 77 and setting the operation mode thereof to the master mode or the slave mode.

For example, suppose that at S100 of FIG. 4, the switch 51 transmits the table creation frame from the port P1 of the switch 51. In this case, from the port P1 of the switch 52, the switch 52 receives the table creation from given from the port P1 of the switch 51 and performs S130 and S140 of FIG. 5. Accordingly, the switch 52 embeds the ID 52 of the switch 52 into the beginning of the free space of the ID area of the received table creation frame and transmits the table creation frame, in which the ID 52 is embedded, from the port P2 of the switch 52.

From the port P1 of the switch 53, the switch 53 receives the table creation frame given from the port P2 of the switch 52 and performs S130 and S140 of FIG. 5. Accordingly, the switch 53 embeds the ID 53 of the switch 53 into the beginning of the free space of the ID area of the received table creation frame and transmits the table creation frame, in which the ID 53 is embedded, from the port P2 of the switch 53.

From the port P2 of the switch 54, the switch 54 receives the table creation frame given from the port P2 of the switch 53 and performs S130 and S140 of FIG. 5. Accordingly, the switch 54 embeds the ID 54 of the switch 54 into the beginning of the free space of the ID area of the received table creation frame and transmits the table creation frame, in which the ID 54 is embedded, from the port P1 of the switch 54.

Then, from the port P2 of the switch 51, the switch 51 receives the table creation frame given from the port P1 of the switch 54. This received table creation frame contains the ID of the switch 51. Accordingly, the switch 51 performs S150 of FIG. 5.

The table creation frame received from the port P2 of the switch 51 was transmitted from the port P1 of the switch 51 and was circulated around the ring shape communication path one round. In the ID area of the circulated table creation frame, the IDs 52 to 54 of the switch 52 to 54 except the switch 51 are embedded in the following order: ID52, ID53 and ID54. The order of ID52, ID53 and ID54 is identical to the order in which the switches 52 to 54 are connected when viewed from the port P1 of the switch 51.

Thus, the switch 51 creates the switch ID table 77 illustrated in FIG. 3 by performing S150 of FIG. 5. Specifically, the first registration process registers the IDs of other switches 52 to 54 in association with the port P1 in the order of ID52, ID53 and ID54. The second registration process registers the Ds 52 to 54 in association with the port P2 in the order of D54, ID53 and ID52.

In similar ways, the other switches 52 to 54 create the switch ID table 77 by performing S150 of FIG. 5. Then, each switch 51 to 54 performs S160 and its subsequent steps of FIG. 5, thereby setting the operation mode of the switch to the master mode or the slave mode. As a result, one switch having the smallest ID value among the switches 51 to 54 functions as the master switch and the other switches function as the slave switches.

In a modification, the particular condition used in S160 may be a largest value. When the total number of switches connected in the ring shape is an odd number, the particular condition may be a median value. The position where the ID of the switch is embedded by each switch 51 to 54 in the table creation frame transmitted at S100 of FIG. 4 may not be the beginning of the ID area but may be the area of the source MAC address.

Figure 6:
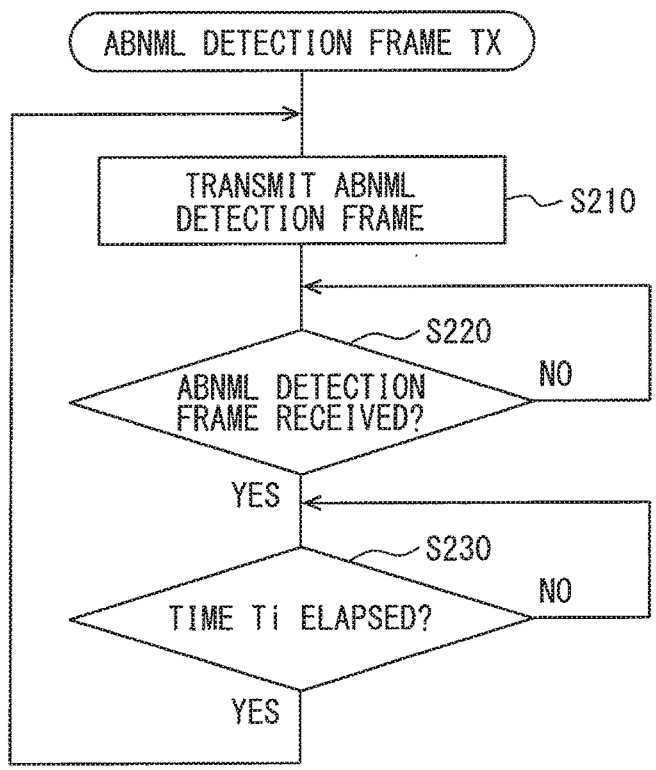
FIG. 6 is a flowchart illustrating an abnormality detection frame transmission process.
Figure 7:
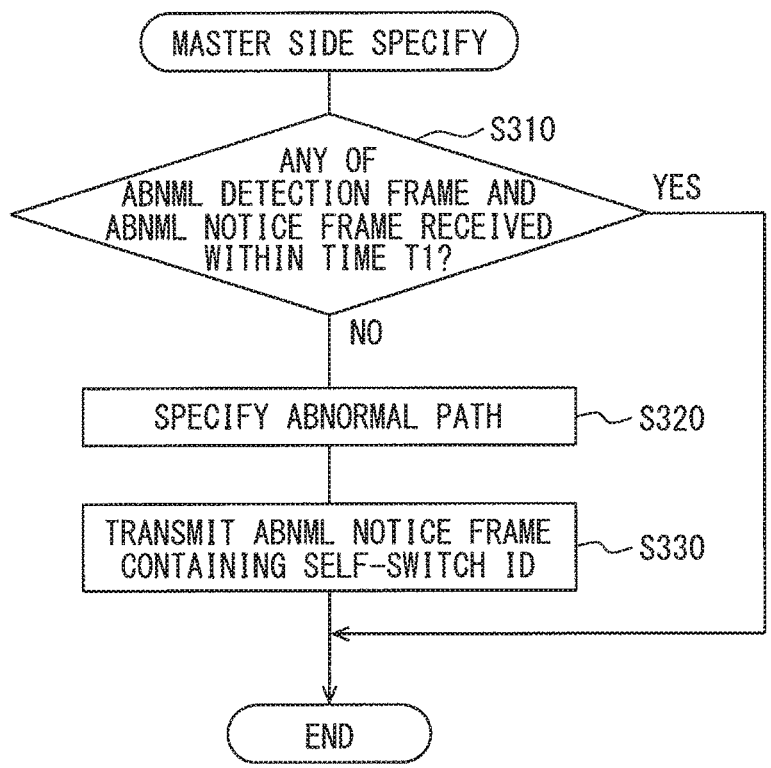
FIG. 7 is a flowchart illustrating a master side specification process.

The master switch, which is one of the switches 51 to 54 and is in the master mode as the set operation mode, performs an abnormality detection frame transmission process illustrated in FIG. 6 and a master side specification process illustrated in FIG. 7. The master switch is a subject-of-action to perform the processes of FIG. 6 and FIG. 7.

Figure 8:
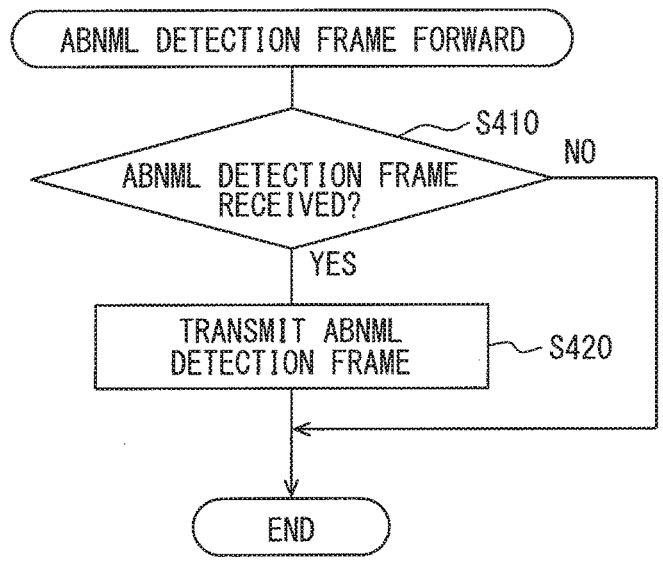
FIG. 8 is a flowchart illustrating an abnormality detection frame forward process.
Figure 9:
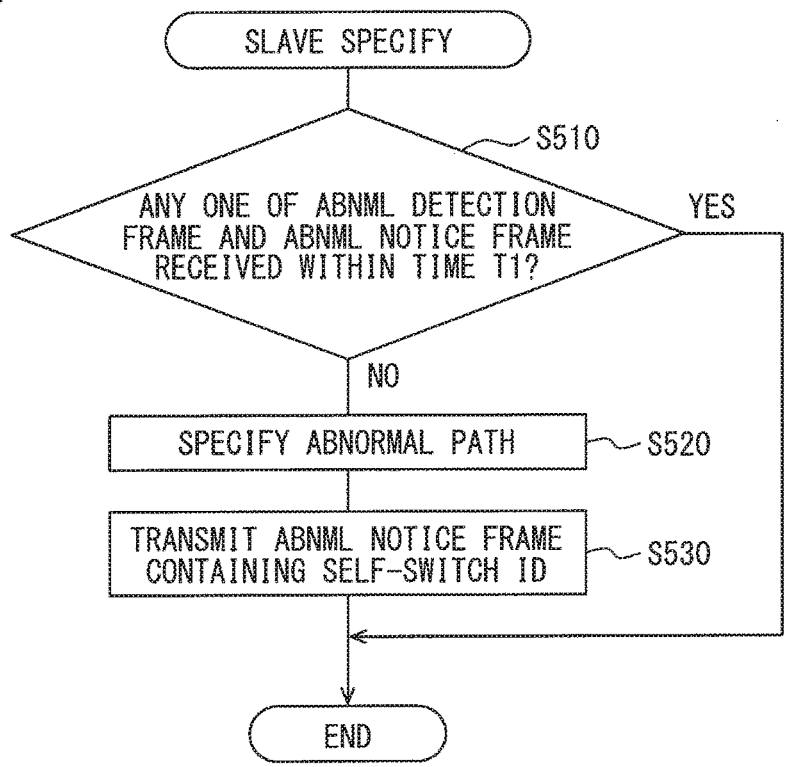
FIG. 9 is a flowchart illustrating a slave side specification process.

The slave switches, which are three switches of the switches 51 to 54 except the master switch and in the salve mode as the operation mode, performs an abnormality detection frame forward process illustrated in FIG. 8 and a salve specification process illustrated in FIG. 9. Each slave switch is a subject-of-action to perform the processes of FIG. 8 and FIG. 9.

<<Abnormality Detection Frame Transmission Process>>

As shown in FIG. 6, upon start of the abnormality detection frame transmission process, the master switch transmits an abnormality detection frame from one of the ring ports P1, P2 of the master switch at S210.

The abnormality detection frame is provided as an Ethernet frame, as illustrated in FIG. 2. The destination MAC address of the abnormality detection frame includes a code indicating that this frame is the abnormality detection frame. In the below description, one of the ring ports P1, P2 of the master switch from which the abnormality detection frame is transmitted at S210 is referred to as a first ring port. The other is referred to as a second ring port. The first ring port corresponds to a first specific port. The second ring port corresponds to a second specific port.

The abnormality detection frame transmitted from the master switch is subject to the abnormality detection frame forward process of FIG. 8 by each of the switches (slave switches) during circulating the ring communication path one round and then returned back to the master switch.

Thus, at S220, the master switch waits for the second ring port to receive the abnormality detection frame transmitted at S210. When the abnormality detection frame is received, the process proceeds to S230. At S230, the master switch determines whether or not a fixed time Ti has elapsed after the transmission of the abnormality detection frame at S210. When it is determined that the fixed time Ti has elapsed, the process returns to S210 and the abnormality detection frame is transmitted from the first ring port.

The master switch transmits the abnormality detection frame from the first ring port at fixed time intervals. The fixed time Ti is longer than a circulation time which is a time taken for the abnormality detection frame to circulate the ring shape communication path one round and return to the master switch. In a modification, the abnormality detection frame transmission process of FIG. 6 may not include S220.

<<Master Side Specification Process>>

When the master switch transmits the abnormality detection frame from the first ring port at S210 of FIG. 6, the master switch performs the master side specification process of FIG. 7.

As shown in FIG. 7, at S310, the master switch determines whether or not, within a predetermined time T1 from transmission of the abnormality detection frame, any one of the abnormality detection frames and an abnormality notification frame transmitted from another switch is received.

The abnormality detection frame subject to determining at S310 whether it is received is the abnormality detection frame transmitted from the first ring port of the master switch. The abnormality notification frame is provided as an Ethernet frame that is transmitted when any of the switches detects an abnormality in the communication path. For example, the destination MAC address of the abnormality notification frame has a code indicating that this frame is the abnormality notification frame. The abnormality notification frame contains a switch ID of a source of this abnormality notification frame. For example, the switch ID is embedded into a specified position in the abnormality notification frame. The specified position may be the beginning of the data area. Alternatively, the specified position may be the area of the source MAC address.

In the present disclosure, a frame circulation direction is a direction in which the abnormality detection frame is circulated one round from the first ring port to the second ring port of the master switch. When one of the switches 51 to 54 is referred to as a reference switch, a communication path between the reference switch and a switch arranged immediately before the reference switch in the frame circulation direction (i.e., a switch arranged next to and on an upstream side of the reference switch in the frame circulation direction) is referred to as an immediate-before communication path. In particular, the immediate-before communication path of the master switch is referred to as a master immediate-before communication path.

In the present embodiment, each slave switch performs the following. When a slave switch specifies an occurrence of an abnormality in the immediate-before communication path of the slave switch, the slave switch transmits the abnormality notification frame containing the ID of the slave switch. In this case, the slave switch transmits the abnormality notification frame from, of the ring pots P1, P2 of the slave switch, a ring port disposed on a downstream side in the frame circulation direction. This function of the slave switch is implemented by the below-described slave side specification process of FIG. 9.

When a salve switch receives, from any one of the ring ports P1, P2, the abnormality notification frame transmitted from another switch, the slave switch transmits the abnormality notification frame from the other of the ring ports without changing it. Not only the slave switches but also the mater switch has this function of forwarding an abnormality notification frame. This function is implemented by the below-described master slave in-common process of FIG. 10.

Thus, if, of the communication paths between respective adjacent switches, an abnormality occurs in a communication path other than the master immediate-before communication and the abnormality notification frame is transmitted from any of the slave switches, this abnormality notification frame arrives at the second ring port of the master switch.

The predetermined time T1 is longer than a circulation time which is a time taken for the abnormality notification frame to circulate the ring shape communication path one round and return back to the master switch. The predetermined time T1 is also longer than the below-described master side notification wait time.

A notification arrival timing is a timing when an abnormality notification frame from any of the slave switches arrives at the master switch in cases where an abnormality occurs in a communication path other than the master immediate-before communication path. A master side notification wait time is a maximum time from a time of transmission of an abnormality detection frame to the notification arrival timing.

When the determination at S310 results in YES, the master switch ends the master side specification process. When the determination at S310 results in YES, the process proceeds to S320. Thus, the master switch proceeds to S320 when neither the abnormality detection frame nor the abnormality notification frame transmitted from another switch is received from the second ring port within the predetermined time T1 from the transmission of the abnormality detection frame from the first ring port.

At S320, based on the switch ID table 77 of the master switch, the master switch specifies the ID of a first-connected switch, which is the first switch when viewed from the second ring port of the master switch (i.e., a switch connected next to and on an upstream side of the master switch in the frame circulation direction). The master switch then specifies an occurrence of an abnormality in a communication between the switch having the specified ID and the second ring port (i.e., the master immediate-before communication path). At S330, the master switch transmits an abnormality notification frame containing the ID of the master switch from the first ring port.

That is, when the determination S310 results in YES, the master switch determines that the frame supposed to be received from the second ring port is un-receivable and that an abnormality occurs in the master immediate-before communication path connected to the second ring port. In order to inform in which communication path the abnormality occurs, the master switch transmits the abnormality notification frame containing the ID of the master switch.

As to S320 and S330, S330 may be performed earlier than S320. Alternatively, S320 and S330 may be performed parallel.

<<Abnormality Detection Frame Forward Process>>

Each slave switch performs the abnormality detection frame forward process of FIG. 8. For example, the abnormality detection frame forward process may be performed at fixed time intervals or may be performed upon frame receipt from any of the ring ports P1, P2.

As shown in FIG. 8, at S410, a slave switch determines whether or not the abnormality detection frame is received from any of the ring ports P1, P2 of the slave switch. When the abnormality detection frame is not received, this abnormality detection frame forward process is ended.

Upon receipt of the abnormality detection frame, the slave switch proceeds to S420. At S420, the slave switch transmits the received abnormality detection frame from the ring port P1, P2 other than the ring port that received the abnormality detection frame. Then the abnormality detection frame forward process is ended.

Accordingly, the salve switches forward the abnormality detection frame between the ports P1, P2. Thus, when the ring shape communication path is normal, the abnormality detection frame transmitted from the master switch is circulated around the ring shape communication path one round and returned back to the master switch.

<<Slave Side Specification Process>>

Each slave switch performs the slave side specification process illustrated in FIG. 9 upon receipt of the abnormality detection frame from any of the ring ports P1, P2. In the below-description, the slave switch acting as a subject-action of the slave side specification process is referred to as a self-slave switch to distinguish from other slave switches. In the below description, of the two ring ports P1, P2 of the self-slave switch, the ring port which receives the abnormality detection frame is referred to as an upstream side ring port. The other of the two ring ports P1, P2 is referred to as a downstream side ring port. The upstream side ring port is a ring port on an upstream side in the frame circulation direction. The downstream side ring port is a ring port on a downstream side in the frame circulation direction. The upstream side ring port corresponds to an example of an upstream side specific port.

As shown in FIG. 9, at S510, the self-slave switch determines whether or not, within a predetermined time T2 from the receipt of the abnormality detection frame, any one of an abnormality detection frame and an abnormality notification frame transmitted from another switch is received from the upstream side ring port.

The predetermined time T2 is longer than the fixed time Ti which is the transmission interval of the abnormality detection frame. The predetermined time T2 is also longer than the below-described slave notification wait time.

An another-switch-notification arrival timing is a timing when an abnormality notification frame from any of other switches arrives at the self-slave switch in cases where an abnormality occurs in a communication path other than the immediate-before communication path of the self-slave switch. The slave side notification wait time is a maximum time from a time of the receipt of the abnormality detection frame to the another-switch-notification arrival timing.

When the determination at S510 results in YES, this slave side specification process is ended. When the determination at S510 results in NO, the process proceeds to S520. Specifically, when, within the predetermined time T2 from the receipt of the abnormality detection frame, the slave switch receives neither the abnormality detection frame nor the abnormality notification frame transmitted from another switch, the process proceeds to S520.

At S520, from the switch ID table 77, the self-slave switch specifies an ID of a first connected switch when viewed from the upstream side ring port (i.e., a switch arranged immediately next to and on the upstream side of the self-slave switch in the frame circulation direction). The slave switch specifies an occurrence of an abnormality in a communication path between the switch assigned the specified ID and the upstream side ring port (i.e., the immediate-before communication path of the self-slave switch). At S530, the self-slave switch transmits the abnormality notification frame containing the ID of the self-slave switch from the downstream side ring port. Then this slave side specification process is ended.

Specifically, when the determination at S510 results in NO, the slave switch determines that a frame supposed to be received from the upstream side ring port is un-receivable, and determines that an abnormality occurs in the immediate-before communication path connected to the upstream side ring port. In order to inform in which communication path the abnormality occurs, the slave switch transmits the abnormality notification frame containing its own ID.

As to S520 and S530, S530 may be performed earlier than S520. Alternatively, S520 and S530 may be performed parallel. The predetermined time T2 may be, for example, set such that the number of connected switches from the master switch in the frame circulation direction is larger, the predetermined time T2 is longer (i.e., has a larger value). From the IDs of other switches registered in the switch ID table 77, the self-slave switch can recognize which ID is the ID of the master switch, and can recognize the number of connected switches from the master switch to the self-slave switch. Thus, the slave switch may be configured such that the number of connected switches from the master switch to the slave switch is larger, the predetermined time T2 is longer. In this configuration, a margin is easily ensured regarding wait for abnormality notification frames from other switches <<Master Slave In-Common Process>>

Figure 10:
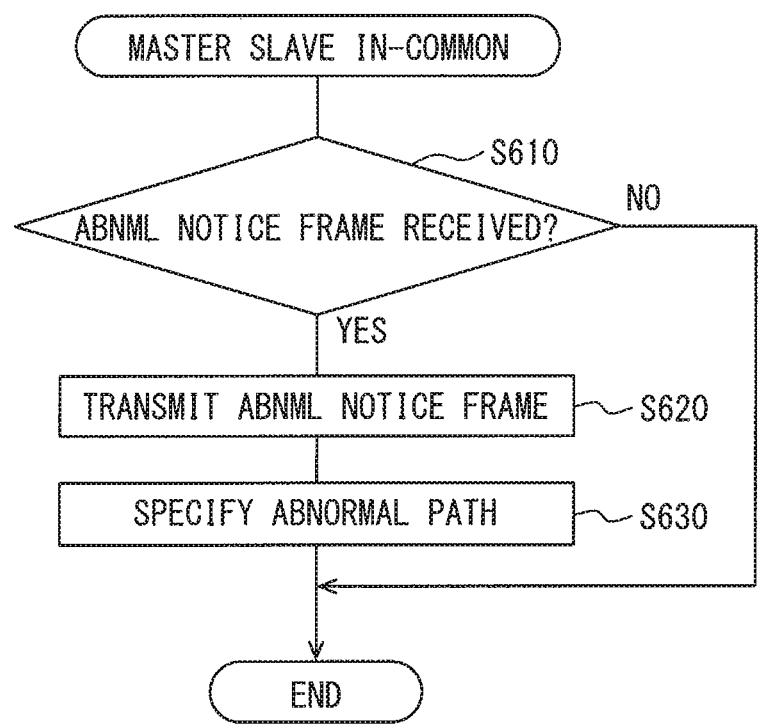
FIG. 10 is a flowchart illustrating a master slave in-common process.

Each switch 51 to 54 performs the master slave in-common process illustrated in FIG. 10. The master slave in-common process may be performed, for example, at fixed time intervals. Alternatively, the master slave in-common process may be performed upon frame receipt from any of the ring ports P1, P2. The master slave in-common process illustrated in FIG. 10 is in common performed by the master switch and the slave switches.

As shown in FIG. 10, at S610, the self-switch 51 to 54 determines whether or not the abnormality notification frame transmitted from another switch is received from any of the ring port P1, P2 of the self-switch. When the abnormality notification frame is not received, this master slave in-common process is ended.

When the abnormality notification frame is received, the process proceeds to S620. At S620, the self-switch 51 to 54 transmits the received abnormality notification frame from the ring port P1, P2 other than the ring port that received the abnormality notification frame. In other words, the abnormality notification frame is forwarded between the ring ports P1, P2. At S630, based on the ID of the switch contained in the received abnormality notification frame (also referred to as hereinafter a received ID), the self-switch 51 to 54 performs a process for specifying an abnormal section of the communication path. Specifically, at S630, the ID of the switch (corresponding to a particular-away relay switch) that is, when viewed from the ring port P1, P2 which received the abnormality notification frame, connected next to and on a far side of the switch having the received ID is specified from the switch ID table 77 of the self-switch. Then, the self-switch specifies an occurrence of abnormality in a communication path between the switch having the specified ID and the switch having the received ID.

Thereafter, the self-switch 51 to 54 ends the master slave in-common process. As to S620 and S630, S630 may be performed earlier than S620. Alternatively, S620 and S630 may be performed parallel.

<Operations of Embodiment>

In the communication network 1, each switch 51 to 54 performs the processes of FIG. 4 and FIG. 5 to actively create the switch ID table 77 thereof and to be set to the master switch or the slave switch.

The master switch, which is one of the switches 51 to 54, performs the process of FIG. 6. The slave switches, which are the others of the switches, perform the process of FIG. 8 individually. In this case, when the communication path is normal, the abnormal detection frame from the master switch is circulated around the communication path one round at fixed time intervals Ti. Specifically, the abnormality detection frame transmitted from the first ring port of the master switch at fixed time intervals Ti is returned back to the second ring port of the master switch via the slave switches.

Moreover, the master switch performs the processes of FIG. 7 and FIG. 10 and each slave switch performs the processes of FIG. 9 and FIG. 10. In order to determine whether a frame from another switch is un-receivable, the master switch makes the determination at S310 of FIG. 7 and the slave switch makes the determination of S510 of FIG. 9.

When the master switch determines that a frame from another switch is un-receivable, the master switches specifies an occurrence of an abnormality in the immediate-before communication path of the master switch and transmits the abnormality notification frame containing the ID of the master switch to the next switch in the frame circulation direction. This function of the master switch is implemented by S320 and S330 of FIG. 7.

Likewise, when the slave switch determines that a frame from another switch is un-receivable, the slave switch specifies an occurrence of an abnormality in the immediate-before communication path of the slave switch and transmits the abnormality notification frame containing the ID of the slave switch to the next switch in the frame circulation direction. This function of the slave switch is implemented by S520 and S530 of FIG. 9.

Moreover, each switch transmits the received abnormality detection frame to the next switch in the frame circulation direction upon receipt of the abnormality detection frame from another switch, and specifies the abnormality section of the communication path based on the ID of the switch contained in the abnormality notification frame. This function of each switch is implemented by S620 and S630 of FIG. 10.

Concrete examples of operations according to the above processes will be described. It is assumed that an abnormality occurs in a communication path between the switch 51 and the switch 54 and that the frame transmission and reception between the switches 51 and 54 becomes impossible. A specific failure is, for example, disconnection of the communication line 34. It is further assumed that the switch 51 is arranged on the downstream side of the switch 54 in the frame circulation direction. In other words, the frame circulation direction is assumed to be the anticlockwise direction in FIG. 1.

In this case, the switch 51 cannot receive the frame from the ring port P2 which is on the switch 54 side. The switch 51 is assumed to be the master switch. Thus, the ring port P1 of the switch 51 is the first ring port and the ring port P2 of the switch 51 is the second ring port.

The determination at S310 of FIG. 7 by the switch 51 results in NO. By performing S320 of FIG. 7, the switch 51 specifies that the immediate-before communication path of the switch 51 is abnormal. Specifically, the switch 51 specifies an occurrence of an abnormality in the communication path between the ring port P2 of the switch 51 and the switch 54, which is the first-connected switch when viewed from the ring port P2 of the switch 51. Moreover, by performing S330 of FIG. 7, the switch 51 transmits the abnormality notification frame containing the ID of the switch 51 from the ring port P1.

The abnormality notification frame transmitted from the switch 51 is conveyed to other switches 52 to 54 in turn. The switches 52 to 54 specify the abnormal section of the communication path by performing S630 of FIG. 10. In this example, because the ID of the switch 51 is contained in the abnormality notification frame, each switch 52 to 54 specifies the occurrence of the abnormality in the communication path between the switch 54 and the switch 51.

When the switch 51 is assumed to be the salve switch, the ring port P2 of the switch 51 is the upstream side ring port and the ring port P1 of the switch 51 is the downstream side ring port.

Accordingly, the switch 51 determines "NO" at S510 of FIG. 9 and specifies that the immediate-before communication path of the switch 51 is abnormal at S520 of FIG. 9. Even when the switch 51 is the slave switch, the switch 51 specifies the occurrence of the abnormality in the communication path between the ring port P2 of the switch 51 and the switch 54 which is first connected when viewed from the ring port P2 of the switch 51. Moreover, by S530 of FIG. 9, the switch 51 transmits the abnormality notification frame containing the ID of the switch 51 from the ring port P1.

Then, the abnormality notification frame transmitted from the switch 51 is conveyed in turn to other switches 52 to 54. The switches 52 to 54 specify, by S630 of FIG. 10, the occurrence of the abnormality in the communication path between the switch 54 and the switch 51.

<Advantages>

When an abnormality occurs in any of the ring shape communication path, each switch 51 to 54 in the communication network 1 can specifies the abnormal section of the communication path.

Thus, when each switch 51 to 54 relays a frame (referred to as hereinafter a relay target frame) designating, as a destination, an ECU connected to the ordinal ports P3, P4 of another switch, the switch can transmit the relay target frame in the below way.

When the communication path is normal (i.e., in a normal state), each switch 51 to 54 transmits the relay target frame from one of the ring ports P1, P2. When an abnormality occurs in any section of the communication path between adjacent switches, each switch 51 to 54 transmits the relay target frame from the ring port P1, P2 that avoids the specified abnormal section of the communication path.

For example, the occurrence of the abnormality in the immediate-before communication path of the switch 51 to 54 is specified, the switch transmits the relay target frame from the ring port P1, P2 other than the ring port that is connected to the immediate-before communication path.

When each switch 51 to 54 has a connection relation specification information the enables the switch to specify which ECU is connected to an ordinal port of which switch, the switch can perform the below process. Based on the connection relation specification information, each switch 51 to 54 specifies a switch having the ordinal port that is connected to an ECU designated as the destination of the relay target frame. Each switch 51 to 54 selects, from the two ring ports P1, P2, the ring port that enables the frame to be transmitted to a destination switch not via the specified abnormal communication path.

In this configuration, each switch 51 to 54 is not required to transmit the relay target frame from both of the ring ports P1, P2 and it becomes possible to reduce traffic (i.e., an amount of data transmitted). Additionally, even if an abnormality occurs in any section of the communication path, the communication can be performed normally and communication reliability is ensured.

Because each switch 51 to 54 performs the process of FIG. 4 and S110 to S150 of FIG. 5, the switch ID table 77 of the switch can be actively created. Therefore, it is unnecessary to pre-store the switch ID table 77 in a non-volatile memory of each switch 51 to 54. Accordingly, an order of connection of the switches 51 to 54 can be changed into any order.

Because each switch 51 to 54 performs S160 to S180 of FIG. 5, the master switch and the slave switches are actively determined. Therefore, it is unnecessary to determine the master switch and the slave switches in advance. Accordingly, in manufacturing switches, it is unnecessary to distinguish a switch for a master switch and a switch for a slave switch from each other in advance.

In the present embodiment, S210 to S230 of FIG. 6 correspond to examples of processes performed by an abnormality detection frame transmission section. S310 to S330 of FIG. 7 correspond to examples of processes performed by a master side specification process section. S410 and S420 of FIG. 8 correspond to examples of processes performed by an abnormality detection frame transmission section. S510 and S530 of FIG. 9 correspond to examples of processes performed by slave side specification process section. S610 to S630 of FIG. 10 correspond to examples of processes performed by a notification receipt process section. S100 of FIG. 4 corresponds to an example of processes performed by a connection information creation frame transmission section. S130 and S140 of FIG. 5 correspond to examples of processes performed by a forward process section. S150 of FIG. 5 corresponds to an example of processes performed by a connection information creation section. S160 of FIG. 5 corresponds to an example of processes performed by a determination section. S170 and S180 of FIG. 5 correspond to examples of processes performed by a mode set section.

Although the embodiments have been illustrated, embodiments are not limited to those illustrated above. Various embodiments are possible. The number of ECUs, the number of switches, the number of ports, and the like illustrated above are examples and may be other numbers.

For example, the master switch, which is one of the switches 51 to 54, may transmit the abnormality detection frame from both of the ring ports P1, P2. The switch ID table 77 may be prestored in the non-volatile memory of each switch 51 to 54. In this case, it is not necessary for each switch 51 to 54 to perform the processes of FIG. 4 and FIG. 5. The switch for the master switch and the switches for the slave switches may be determined in advance. An ECU serving as a communication node may be connected to the ordinal port P3, P4 of the switch 51 to 54 via another switch. It may be sufficient for the switch 51 to 54 to have a function to forward a frame, which is received from the ordinal port of the switch, to a communication node, which is connected to another ordinal port of the switch or the ordinal port of another switch. The communication protocol is not limited to Ethernet but may be other protocols.

In the above embodiment, functions of a single element may be distributed to multiple elements. Functions of multiple elements may be integrated into a single element. Part of the configuration of the above embodiment may be omitted. Any modifications and extensions are possible within in the spirit and scope of the present disclosure. Embodiments are not limited to the above illustrated communication network and switch.

Embodiments may be a program that cases a computer to function as the switch, a non-transitory storage medium storing the program, and a method for detecting an abnormal section of a communication path.

What is claimed is:

1. A communication network comprising:
a plurality of relay devices each including a plurality of ports for frame transmission and reception,
wherein:
the ports of each relay device include two specific ports;
the relay devices are connected in a ring shape by connecting the two specific ports of the relay devices;
each relay device includes a storage for storing
identification information of other relay devices, which constitutes the relay devices connected in the ring shape, and
connection information indicating an order in which the other relay devices are connected when viewed from the relay device;
a master relay device, which is one of the relay devices, includes an abnormality detection frame transmission section and a master side specification section;
the abnormality detection frame transmission section transmits an abnormality detection frame at fixed time intervals from one of the two specific ports of the master relay device, wherein the one of the two specific ports from which the abnormality detection frame is transmitted is a first specific port and the other of the two specific ports is a second specific port; and
when neither the frame abnormality detection nor an abnormality notification frame transmitted from another relay device is received from the second specific port of the master relay device within a predetermined time period from transmission of the abnormality detection frame from the abnormality detection frame transmission section, the master side specification section
specifies, from the connection information, the identification information of a first-connected relay device which is the relay device that is first connected when viewed from the second specific port of the master relay device,
specifies an occurrence of an abnormality in a communication path between the first-connected relay device and the second specific port of the master relay device, and transmits, from the first specific port, an abnormality notification frame that contains the identification information of the master relay device;
the relay devices other than the master relay device are slave relay devices;
each slave relay device includes an abnormality detection frame forwarding section and a slave side specification section;
the abnormality detection frame forwarding section of the slave relay device, upon receipt of the abnormality detection frame from any one of the two specific ports, transmits the received abnormality detection frame from the other of the two specific ports;
of the two specific ports of each slave relay device, one from which the abnormality detection frame is received is an upstream side specific port and the other is a downstream side specific port;
when neither the abnormality detection frame nor the abnormality notification frame transmitted from another relay device is received from the upstream side specific port of the slave relay device within a predetermined time period from receipt of the abnormality detection frame at the upstream side specific port of the slave relay device, the slave side specification section of the slave relay device
specifies the identification information of a first-connected relay device which is the relay device that is first connected when viewed from the upstream side specific port,
specifies an occurrence of an abnormality in a communication path between the first-connected relay device and the upstream side specific port, and
transmits, from the downstream side specific port, an abnormality notification frame that contains the identification information of the slave relay device;
each of the master relay device and the slave relay devices includes a notification reception process section;
when one of the two specific ports of the relay device receives the abnormality notification frame transmitted from another relay device, the notification reception process section of the relay device
transmits the received abnormality notification from the other of the two specific ports,
specifies, from the connection information, the identification information of a particular-away relay device which is the relay device that is, when viewed from the one of the two specific ports which received the abnormality notification frame, connected next to and on a far side of the relay device identified by the identification information contained in the received abnormality notification frame, and
specifies an occurrence of an abnormality in a communication path between the particular-away relay device and the relay device identified by the identification information contained in the received abnormality notification frame.

2. The communication network according to claim 1, wherein:
each relay device further includes a connection information creation frame transmission section, a forward process section and a connection information creation section;
as a frame for creating the connection information, the connection information creation frame transmission section of the relay device transmits a connection information creation frame containing the identification information of the relay device from at least one of the two specific ports of the relay device;
when the relay device receives, from any of the two specific ports, a connection information creation frame indicating another relay device as a source of the connection information creation frame and not containing the identification information of the relay device, the forward process section of the relay device
embeds the identification information of the relay device in a beginning of a free space of an identification information storage area of the received connection information creation frame, and
transmits the connection information creation frame, in which the identification information of the relay device is embedded, from the specific port other than the specific port which received the connection information creation frame; and
when the relay device receives the connection information creation frame containing its own identification information from any of the two specific ports, the connection information creation section of the relay device creates the connection information and stores the connection information in the storage of the relay device based on the identification information of other relay devices embedded in the received connection information creation frame and based on an order in which the identification information of the other relay devices are arranged in the received connection information creation frame.

3. The communication network according to claim 1, wherein:
each relay device further includes a determination section;
the determination section of the relay device determines whether or not, among the identification information of the relay device and the identification information of other relay devices contained in the connection information of the relay device, one identification information meeting a predetermined condition is the identification information of the relay device;
when the determination section of the relay device determine that the one identification information meeting the predetermined condition is the identification information of the relay device, the relay device functions as the master relay device; and
when the determination section of the relay device determine that the one identification information meeting the predetermined condition is not the identification information of the relay device, the relay device functions as the slave relay device.

4. A subject relay device used as each relay device of a plurality of relay devices in a communication network in which the relay device are connected in a ring shape, wherein
each relay device includes a plurality of ports for frame transmission and reception
the ports of each relay device include two specific ports;
the relay devices are connected in a ring shape by connecting the two specific ports of the relay devices;
the subject relay device comprising:
a storage for storing
identification information of other relay devices of the relay devices connected in the ring shape and
connection information indicating an order in which the other relay devices are connected when viewed from the subject relay device;
a determination section that determines whether or not one identification information meeting a predetermined condition among the identification information of the subject relay device and the identification information of other relay devices indicated in the connection information of the subject relay device is the identification information of the subject relay device;
a mode set section that
sets an operation mode of the subject relay device to a master mode when the determination section determines that the one identification information meeting the predetermined condition is the identification information of the subject relay device, and
sets the operation mode of the subject relay device to a slave mode when the determination section determines that the one identification information meeting the predetermined condition is not the identification information of the subject relay device;
an abnormality detection frame transmission section and a master side specification process section each operating when the operation mode of the subject relay device is set to the master mode,
wherein:
a first specific port is one of the two specific ports of the subject relay device and a second specific port of the other of the two specific ports;
the abnormality detection frame transmission section transmits an abnormality detection frame from the first specific port at fixed time intervals;
when neither the frame abnormality detection nor an abnormality notification frame transmitted from another relay device is received from the second specific port of the subject relay device within a predetermined time period from transmission of the abnormality detection frame from the abnormality detection frame transmission section, the master side specification section
specifies, from the connection information, the identification information of a first-connected relay device which is the relay device that is first connected when viewed from the second specific port of the subject relay device,
specifies an occurrence of an abnormality in a communication path between the first-connected relay device and the second specific port of the subject relay device, and
transmits, from the first specific port, an abnormality notification frame that contains the identification information of the subject relay device;
the subject relay device further comprising
an abnormality detection frame forward section and a slave side specification process section each operating when the operation mode of the subject relay device is set to the slave mode,
wherein:
upon receipt of the abnormality detection frame from any one of the two specific ports of the subject relay device, the abnormality detection frame forwarding section transmits the received abnormality detection frame from the other of the two specific ports;
of the two specific ports of the subject relay device, one from which the abnormality detection frame is received is an upstream side specific port and the other is a downstream side specific port;
when neither the abnormality detection frame nor the abnormality notification frame transmitted from another relay device is received from the upstream side specific port of the subject relay device within a predetermined time period from receipt of the abnormality detection frame at the upstream side specific port of the subject relay device, the slave side specification section of the subject relay device specifies the identification information of a first-connected relay device which is the relay device that is first connected when viewed from the upstream side specific port of the subject relay device, specifies an occurrence of an abnormality in a communication path between the first-connected relay device and the upstream side specific port of the subject relay device, and transmits, from the downstream side specific port of the subject relay device, an abnormality notification frame that contains the identification information of the subject relay device, the subject relay device further comprising a notification reception process section operating when the operation mode of the subject relay device is set to any of the maser mode and the slave mode, wherein, when one of the two specific ports of the relay device receives the abnormality notification frame transmitted from another relay device, the notification reception process section of the subject relay device transmits the received abnormality notification from the other of the two specific ports, specifies, from the connection information, the identification information of a particular-away relay device which is the relay device that is, when viewed from the one of the two specific ports which received the abnormality notification frame, connected next to and on a far side of the relay device identified by the identification information contained in the received abnormality notification frame, and specifies an occurrence of an abnormality in a communication path between the particular-away relay device and the relay device identified by the identification information contained in the received abnormality notification frame.

5. The subject relay device according to claim 4, further comprising:

a connection information creation frame transmission section, a forward process section and a connection information creation section, wherein:

as a frame for creating the connection information, the connection information creation frame transmission section transmits a connection information creation frame containing the identification information of the subject relay device from at least one of the two specific ports of the subject relay device;

when the subject relay device receives, from any of the two specific ports, a connection information creation frame indicating another relay device as a source of the connection information creation frame and not containing the identification information of the subject relay device, the forward process section of the subject relay device embeds the identification information of the subject relay device in a beginning of a free space of an identification information storage area of the received connection information creation frame, and transmits the connection information creation frame, in which the identification information of the subject relay device is embedded, from the specific ports other than the specific port which received the connection information creation frame; and when the subject relay device receives the connection information creation frame containing the identification information of the subject relay device from any of the two specific ports, the connection information creation section of the subject relay device creates the connection information and stores the connection information in the storage of the subject relay device based on the identification information of other relay devices embedded in the received connection information creation frame and based on an order in which the identification information of the other relay devices are arranged in the received connection information creation frame.

* * * * *